United States Patent
Reynolds et al.

(10) Patent No.: US 7,649,076 B2
(45) Date of Patent: Jan. 19, 2010

(54) CATALYST FREE POLYMERIZATION OF 3,4-ALKYLENEDIOXYPYRROLE AND 3,4-ALKYLENEDIOXYFURAN

(75) Inventors: John Robert Reynolds, Gainesville, FL (US); Ryan Michael Walczak, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 231 days.

(21) Appl. No.: 11/750,552

(22) Filed: May 18, 2007

(65) Prior Publication Data

US 2007/0270571 A1 Nov. 22, 2007

Related U.S. Application Data

(60) Provisional application No. 60/801,519, filed on May 18, 2006.

(51) Int. Cl.
C08G 75/00 (2006.01)
(52) U.S. Cl. ...................................... 528/373
(58) Field of Classification Search ................. 528/373
See application file for complete search history.

(56) References Cited

U.S. PATENT DOCUMENTS

| | | | |
|---|---|---|---|
| 4,599,194 | A | 7/1986 | Frommer et al. |
| 4,987,042 | A | 1/1991 | Jonas et al. |
| 7,034,104 | B2 | 4/2006 | Baik et al. |
| 2003/0174377 | A1 * | 9/2003 | Reynolds et al. ............ 359/265 |
| 2004/0171790 | A1 | 9/2004 | Baik et al. |

FOREIGN PATENT DOCUMENTS

| | | |
|---|---|---|
| AU | 263238 | 11/1965 |
| JP | 60201244 A * | 10/1985 |
| JP | 63010685 A * | 10/1986 |
| JP | 2002-241383 | 8/2002 |
| WO | WO 03/055889 A1 | 7/2003 |

OTHER PUBLICATIONS

Odian (Principles of Polymerization, 3rd Ed., p. 78, John Wiley & Sons, Inc.).*
Odian (Principles of Polymerization, 3rd Ed., p. 78, John Wiley & Sons, Inc.),1991.*
Meng, H., et al., "Solid-State Synthesis of a Conducting Polythiophene via an Unprecedented Heterocyclic Coupling Reaction," *J. Am. Chem. Soc.*, 2003, pp. 15151-15162, vol. 125.
Yamamoto, T., et al., "Synthesis of Non-Doped Poly(3, 4-ethylenedioxythiophene) and its Spectroscopic Data," *Synthetic Metals*, 1999, pp. 237-239, vol. 100.
Yamamoto, T., et al., "Neutral poly(3, 4-ethylenedioxythiophene-2,5-diyl)s: Preparation by Organometallic Polycondensation and Their Unique P-Doping Behavior," *Polymer*, 2002, pp. 711-719, vol. 43.
Tran-Van, F., et al., "A Fully Undoped Oligo(3, 4-ethylenedioxythiophene): Spectroscopic Properties" *Synthetic Metals*, 2001, pp. 381-382, vol. 119.
Tran-Van, F., et al., "Fully Undoped and Soluble Oligo(3, 4-ethylenedioxythiophene)s: Spectroscopic Study and Electrochemical Characterization," *J. Mater. Chem.*, 2001, pp. 1378-1382, vol. 11.
Zong, K., et al., "3, 4-Alkylenedioxypyrroles: Functionalized Derivatives as Monomers for New Electron-Rich Conducting and Electroactive Polymers," *J.Org. Chem.*, 2001, pp. 6873-6882, vol. 66.
Sonmez, G., et al., "N-Substituted Poly(3, 4-propylenedioxypyrrole)s: High Gap and Low Redox Potential Switching Electroactive and Electrochromic Polymers," *Macromolecules*, 2003, pp. 639-647, vol. 36.
Brockmann, T., et al., "Synthesis and Properties of Low Band-gap Zwitterionic and Planar Conjugated Pyrrole-Derived Polymeric Sensors. Reversible Optical Absorption Maxima from the UV to the Near-IR," *Journal of the American Chemical Society*, 1995, pp. 4437-4447, vol. 117, No. 16.
Merz, A., et al., "Radical Dimerization of 5,5'-Diphenyl-3,3',4,4'-tetramethoxy-2,2'-bipyrrole: π Dimer in the Crystal, σ Dimer in Solution," *Angew. Chem. Int. Ed.*, 1999, pp. 1442-1446, vol. 38, No. 10.

* cited by examiner

*Primary Examiner*—Randy Gulakowski
*Assistant Examiner*—Shane Fang
(74) *Attorney, Agent, or Firm*—Saliwanchik, Lloyd & Saliwanchik

(57) ABSTRACT

A method to prepare halogen end-capped polypyrroles, polyfurans or copolymeric pyrroles and furans is presented that readily occurs in a liquid state as well as a solid state without the need of a catalyst from a dihalopyrrole monomer, dihalofuran monomer, or a mixture of monomers. The polymerization mixture can be modified to include a monohalo-monomer for the introduction of a specific end-group or a polyhalo-monomer to form a branched polymer or network. An initiating species can be included in the polymerization mixture to avoid an induction period or to commence the polymerization process on demand. The electroactive polymers can be formed as a bulk material, a coating, or as a film.

11 Claims, No Drawings

CATALYST FREE POLYMERIZATION OF 3,4-ALKYLENEDIOXYPYRROLE AND 3,4-ALKYLENEDIOXYFURAN

CROSS-REFERENCE TO RELATED APPLICATIONS

The present application incorporates by reference and claims priority to U.S. Provisional Patent Application Ser. No. 60/801,519, entitled "CATALYST FREE POLYMERIZATION OF 3,4-ALKYLENEDIOXYPYRROLES AND 3,4-ALKYLENEDIOXYFURANS" filed May 18, 2006.

STATEMENT REGARDING FEDERALLY SPONSORED RESEARCH OR DEVELOPMENT

Not applicable.

FIELD OF THE INVENTION

The invention is directed to methods of forming conjugated conducting polymers. Particularly it is directed to the formation of substituted polypyrroles and polyfurans.

BACKGROUND OF THE INVENTION

Conjugated conducting polymers have generated great interest because of their moderate charge mobilities, ability to be redox doped to highly conducting compositions, along with the ability to change optical properties reversibly. Conducting polymers show potential in commercial applications including color changing materials, conductors, antistatic coatings, electronic components, photovoltaic devices and light emitting devices. Commercial products from conducting polymers are potentially cost effective, more easily processed, lighter in weight, and more mechanically flexible, than products fabricated from alternate material in existing technologies. A class of conducting polymers, polyheterocyclics, which include polypyrroles, and polyfurans, are a well-known class of conducting polymers. Such polyheterocyclic conducting polymers have been extensively studied in electrochromic devices, photovoltaic devices, transparent conductors, antistatic coatings, and as the hole-transport layer in light emitting diodes. Appending a 3,4-alkylenedioxy bridge on the heterocycle allows a modified polyheterocycle, where the bridge does not cause an undesirable conformational change in the backbone of the polymer, and the electron donating effect of the oxygen substituents increases the HOMO of the conjugated polymer, reducing both its oxidation potential and its electronic band gap.

The poly(3,4-alkylenedioxypyrrole)s are conjugated polymers that show great potential due to their wide range of band gaps, low oxidation potentials, biological compatibility, and flexibility towards functionalization. However, their progress has been limited to some degree because of difficult and inefficient synthetic pathways to 2,5-dihydro-3,4-alkylenedixypyrrole monomers. The poly(3,4-alkylenedioxyfuran)s are not well known, having only been reported in a Japanese patent application.

The pyrrole and furan-based 3,4-alkylenedioxyheterocycle polymers are commonly prepared by the chemical or electrochemical oxidative polymerization of 3,4-alkylenedioxypyrroles or 3,4-alkylenedioxyfurans. However these monomers, with hydrogen in the 2- and 5-positions of the heterocycle ring, are not readily synthesized in an efficient manner. These syntheses generally involve multiple steps where one or more of the steps are difficult or poor in yield.

The chemical polymerization of 3,4-alkylenedioxypyrroles is typically carried out with an oxidizing agent, such as ferric chloride or cupric chloride. This results in a doped polymer which is often insoluble unless a polyelectrolyte, such as poly(styrene sulfonic acid) is used to yield a processable polymer solution. In many polymers, the use of chemical oxidants such as ferric chloride results in a material with trapped metals, which are difficult to remove. Furans are sensitive to and undergo decomposition in their presence of acid. The poly(styrene sulfonic acid) complexes of the polymers have excess acid sites present in the final material that can degrade materials that are commonly used as electrodes.

Poly(3,4-alkylenedioxythiophene)s are often prepared in a similar manner to that of the poly(3,4-alkylenedioxypyrrole)s, where again a doped polymer results upon polymerization. To obtain the neutral polymer, a Ni(0) complex promoted polycondensation of 2,5-dihalo-3,4-ethylenedioxythiophenes has been employed. However in this manner unprocessable polymers (Yamamoto et al., *Synth. Met.* 1999 100, 237; Yamamoto et al., *Polymer* 2002, 43, 711) result or only low molecular weight materials are formed (Tran-Van et al., *Synth. Met.* 2001, 119, 381; Tran-Van et al., *J. Mater. Chem.*, 2001, 11, 1378).

Balk et al. U.S. Pat. No. 7,034,104 discloses that 2,5-dihalo-3,4-dialkyloxy- or 2,5-dihalo-3,4-alkylenedioxythiophene can be polymerized with an acid. Although claimed as comprising an acid catalyst, the polymerization required a stoichiometric equivalent up to a 20 fold excess of acid, relative to the monomer in solution, at temperatures in excess of 100° C. to achieve a doped polymer with conductivities between 19 and 255 S/cm after removal of the solvent.

To achieve a well defined polymer structure of poly 3,4-ethylenedioxythiophene, the solid state polymerization of 2,5-dihalo-3,4-ethylenedioxythiophene was studied by Meng et al. *J. Am. Chem. Soc.* 2003, 125, 15151. The polymerization of the dibromo monomer occurs at room temperature but only over an extremely long period of time. The polymerization occurs in a significantly shorter period of time in the crystalline state with the dibromo monomer when heated to slightly below the melting point of 96-7° C. but not in the liquid state when rapidly melted. The compound polymerized spontaneously at about 140° C. if slowly heated in a large sample, but this polymerization was attributed to the accumulation of catalytic impurities and no polymerization was possible in solution. The diiodo monomer, melting point 185-8° C., can be polymerized but only at temperatures in excess of 130° C. The dichloro monomer, melting point 60-2° C., does not polymerize in the solid state. Differences in the polymerizability are attributed to the difference in the crystal structure. The distance between intermolecular halogen atoms relative to the sum of their van der Waals radii was correlated with the conclusion that polymerization is promoted when the sum of their van der Waals radii exceeds the distance between intermolecular halogen atoms, as in the dibromo and diiodo crystals but not in the dichloro crystals. Another correlation made with polymerizability was with the carbon-halogen-halogen angle in the crystal structure. This angle is nearly a right angle in the dibromo and diiodo crystals, 106.7° and 101.6° respectively, but the atoms are co-linear, 180° in the dichloro crystal. Hence, this study indicates that polymerization should not be expected in the liquid or solution state, and should only be expected in the crystalline state if the crystal structure is known to have the proper spacing and orientation of monomer units within the crystal.

Although the polymerization of 2,5-dihalo-3,4-alkylenedioxythiophenes was first reported eight years ago, the polymerization of the 2,5-dihalo-3,4-alkylenedioxypyrroles and 2,5-dihalo-3,4-alkylenedioxyfurans has not been reported with or without a catalyst. It would be desirable to prepare poly(3,4-alkylenedioxypyrrole)s or poly(3,4-alkylenedioxyfuran)s by the polymerization of these dihalo monomers as they can be prepared in much higher yield than the 3,4-alkylenedioxypyrroles and 3,4-alkylenediloxyfurans and are much more easily purified. This should lead to a reduction in the cost of the polymers. Some of the applications for polymers prepared by such a method could be for electrochromic windows, mirrors and displays; field effect transistors, supercapacitors, batteries and other electronic components; electronic paper; camouflage; anti-stat conductors; and photovoltaic devices.

SUMMARY OF THE INVENTION

The present invention is directed to a method of preparing a substituted polypyrrole, polyfuran, or their copolymers by the polymerization of at least one 2,5-dihalo-3,4-disubstituted-pyrrole monomer, at least one 2,5-dihalo-3,4-disubstituted-furan monomer, or a mixture of these monomers of the formula:

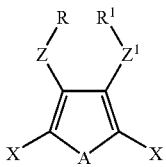

or the formula:

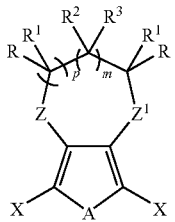

where X is independently F, Cl, Br, or I; Z and $Z^1$ are independently O or S; A is O or NR'; m is 0, 1, or 2; p is 0 or 1; and R, R', $R^1$, $R^2$, and $R^3$ are independently H, alkyl, aryl, alkylaryl, a functional alkyl, aryl, functional aryl alkylaryl, functional alkylaryl group and where any or all of the multiple substituents R, $R^1$, $R^2$, or $R^3$ are chosen independently. The polymerization can be carried out with a solid monomer, a liquid monomer, or with the monomer as a solute in solution. The polymerization process can include in the monomer mixture at least one end-capping monohalo monomer of the formula:

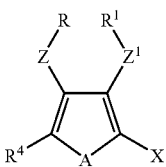

or the formula:

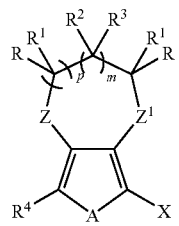

where X is independently F, Cl, Br, or I; Z and $Z^1$ are independently O or S; A is O or NR'; m is 0, 1, or 2; p is 0 or 1; and R, R', $R^1$, $R^2$, $R^3$ and $R^4$ are independently H, alkyl, aryl, alkylaryl, a functional alkyl, aryl, functional aryl alkylaryl, functional alkylaryl group and where any or all of the multiple substituents R, $R^1$, $R^2$, or $R^3$ are chosen independently. A cross-linking polyhalo monomer with two or more of dihalo monomers connected via a bond or series of bonds between any R, R', $R^1$, $R^2$, or $R^3$ groups of two or more dihalo monomers can permit the formation of a branched polymer or a network. Upon formation of the polymer, hydrazine can be added to aid in the removal of side products and facilitate the isolation of the polymer. The monomer or monomer mixture can be polymerized as a coating on a solid substrate from a fluid phase of the liquid monomer or a monomer in solution. The substrate can have any shape or structure, as for example, a fiber. When the solid substrate is non-stick, does not adhere to the resulting polymer, the polymer can be delaminated from the substrate surface as a free-standing film. Alternately the film can result from casting a fluid monomer polymerization mixture on a non-solvent, a non-miscible liquid. Although cast from a solution, the solvent can be fully or partially removed prior to the polymerization of the dihalo monomer. An acid can be included into the polymerization mixture to promote the polymerization where the acid can be any appropriate Lewis acid, protic acid, organic acid or polymeric acid.

The invention permits the formation of a polypyrrole, polyfuran, or copolymer of these heterocyclic monomers with two halogen end-groups as an α,Ω-dihalo-poly(3,4-disubstituted-pyrrole), α,Ω-dihalo-poly(3,4-disubstituted-furan), α,Ω-dihalo-copoly(3,4-disubstituted-pyrrole), α,Ω-dihalo-copoly(3,4-disubstituted-furan) or α,Ω-dihalo-copoly(3,4-disubstituted-pyrrole-3,4-disubstituted-furan), where the polypyrrole, polyfuran, or copolymer has the formula:

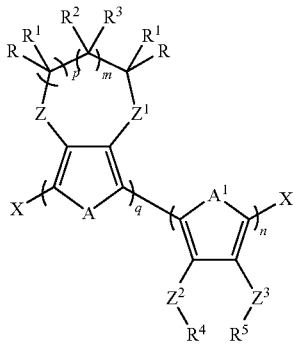

where X is independently F, Cl, Br, or I; Z, $Z^1$, $Z^2$ and $Z^3$ are independently O or S; A and $A^1$ are independently O or NR'; m is 0, 1, or 2; p is 0 or 1; q is 0 to 1,000; n is 0 to 1,000; and q+n is 2 to 1,000 and R, R', $R^1$, $R^2$, $R^3$, $R^4$ and $R^5$ are independently H, alkyl, aryl, alkylaryl, a functional alkyl, aryl, functional aryl alkylaryl, functional alkylaryl group and where any or all of the multiple substituents R, R', $R^1$, $R^2$, or $R^3$ are chosen independently. When the polymer is a copolymer, it can have a random or block structure. When a sufficient number of R, R', $R^1$, $R^2$, $R^3$, $R^4$ and $R^5$ substituents are connected via at least one covalent bond the polymer can be in the form of a network.

DETAILED DESCRIPTION OF THE INVENTION

The invention involves the preparation of poly(3,4-dialkyloxypyrrole)s, poly(3,4-dialkylthiopyrrole)s, poly(3,4-alkylenedioxypyrrole)s, poly(3,4-alkylenedithiopyrrole)s, poly (3,4-dialkyloxyfuran)s, poly(3,4-dialkylthiofuran)s, poly(3, 4-alkylenedioxyfuran)s, or poly(3,4-alkylenedithiofuran)s via the catalyst free polymerization of 2,5-dihalo-3,4-dialkyloxypyrrole, 2,5-dihalo-3,4-dialkylthiopyrrole, 2,5-dihalo-3, 4-alkylenedioxypyrrole, 2,5-dihalo-3,4-alkylenedithiopyrrole, 2,5-dihalo-3,4-dialkyloxyfuran, 2,5-dihalo-3,4-dialkylthiofuran, 2,5-dihalo-3,4-alkylenedithiofuran, or 2,5-dihalo-3,4-alkylenedioxyfuran. These dihalo compounds will hereafter be collectively referred to as dihalo monomers even if a functional group containing one or more halogen atoms is linked to the compound via the ether linkage or in the case of the pyrroles, via an amine linkage. This polymerization can be carried out over a wide range of temperatures and can be carried out in the presence of air or in an inert atmosphere. The polymerization can also be carried out in a neat liquid phase, as an amorphous solid, or in solution. No initiator or catalyst is necessary for polymerization, however, an acid can be included if desired to promote the polymerization when the specific monomers used are stable to the acid.

The dihalo monomers have the structure:

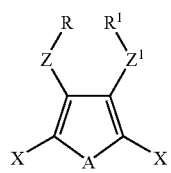

(1)

where X is independently F, Cl, Br, or I; Z and $Z^1$ are independently O or S; A is O or NR'; and R, R' and R' are independently H, alkyl, aryl, or any other organic residue where the organic residue may contain any heteroatom and functional group that does not inhibit or interfere with the polymerization in an adverse manner. R and $R^1$ may be joined as an alkylene bridge, an arylene bridge, a heteroatom containing alkylene bridge where Z is bonded to carbon, or a heteroatom containing arylene bridge where Z is bonded to carbon. The two X groups may be different halogens. Dihalo monomers with alkylene bridges (having a substituted or unsubstituted carbon chain completing a diether, dithioether or monoether monothioether ring on the heterocyclic ring) have the structure:

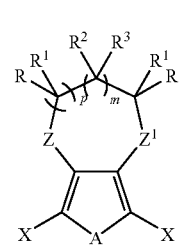

(2)

where X is independently F, Cl, Br, or I; Z and $Z^1$ are independently O or S; A is O or NR'; m is 0, 1, or 2; p is 0 or 1; and R, R', $R^1$, $R^2$, and $R^3$ are independently H, alkyl, aryl, alkylaryl, a functional alkyl, aryl, functional aryl alkylaryl, functional alkylaryl group and where any or all of the multiple substituents R, $R^1$, $R^2$, or $R^3$ are chosen independently (i.e. the two R groups may be different, the two $R^1$ groups may be different, the two or three $R^2$ may be different, and the two or three $R^3$ may be different). Again the two X groups may be different halogens.

Polymerization occurs as illustrated in the following equation, Equation 1:

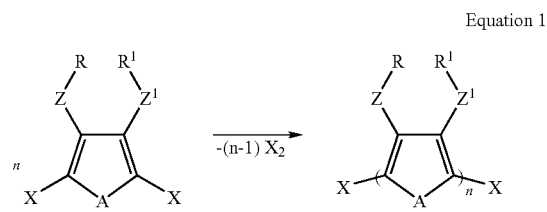

Equation 1 where n is 2 to 1,000 where the value can vary depending on the monomer structure, composition of monomers, solvent, temperatures, capping agents and other factors. The halogen molecule that is lost is not necessarily lost from the polymerization mixture and can act as a dopant to the polymer to enhance the conductivity and other properties of the polymer. The presence and proportion of the halogen molecule in the final mixture will depend upon conditions of the polymerization, for example the time, temperature, and pressure of polymerization and the presence or absence of an agent to scavenge released halogen. When permitted by the nature of the monomer and resulting polymer, an acid can be included into the polymerization mixture to promote the polymerization. In general, although not necessarily, the acid does not exceed 10 mole percent of the monomer and is preferably less than about 0.01 mole percent. The acid can be a Lewis acid, protic acid, organic acid or polymeric acid. A halogen molecule, such as $I_2$, can be added to promote the polymerization.

Polymerization can be carried out over a wide range of temperatures. The appropriate temperature will be imposed by the physical properties of the dihalo monomer, a solvent, or a substrate upon which the polymerization is carried out (e.g. melting point, boiling point, decomposition temperature), chosen to provide a desired polymerization rate, or to promote or avoid a chemical or physical change in the resulting electroactive polymer. In general the temperature is preferably between about 0 and about 60° C. but can be higher or lower than this range based on the monomer, solvent or other conditions employed. Solvents that can be used include dichloromethane, carbon tetrachloride, dichloroethane, trichloroethane, benzene, and toluene. Other solvents can be used for the practice of the invention.

Many structural variations can be formed. For example, two or more different dihalo monomers can be copolymerized to modify and enhance various properties or introduce functional groups to permit specific modification of materials with these conjugated polymers. When carrying out copolymerization, a second dihalo monomer can be introduced to the polymerization mixture, after a first dihalo monomer has polymerized to some degree, to achieve a copolymer with a non-random distribution of repeating units in the final polymer. The two dihalo monomers can be polymerized separately to some degree and then combined to achieve a copolymer with blocks of the two repeating units that are larger than one can achieve from polymerizing a mixture of the two dihalo monomers directly. These variations on the mode of introduction of the dihalo monomers can be extended to a mixture of three or more dihalo monomers.

The natural end-group of the polymers prepared by this method is a halogen. The halogen can react with an organometallic reagent, such as butyllithium and subsequently treated with a hydrogen donor to achieve a hydrogen end-group if desired. Other end-group modifications are possible and can be recognized by those skilled in the art.

The molecular weight of the final polymer can be controlled by the inclusion of a monohalo monomer. Functionality can be incorporated at chain ends by the use of functionalized monohalo monomers. Appropriate 2-halo-3,4-dialkyloxypyrrole, 2-halo-3,4-dialkylthiopyrrole, 2-halo-3,4-alkylenedioxypyrrole, 2-halo-3,4-alkylenedithiopyrrole, 2-halo-3,4-dialkyloxyfuran, 2-halo-3,4-dialkylthiofuran, 2-halo-3,4-alkylenedithiofuran, or 2-halo-3,4-alkylenedioxyfuran can be used to control the molecular weight or to produce telechelic polymers where the resulting poly(3,4-dialkyloxypyrrole), poly(3,4-dialkylthiopyrrole), poly(3,4-alkylenedioxypyrrole), poly(3,4-alkylenedithiopyrrole), poly(3,4-dialkyloxyfuran), poly(3,4-dialkylthiofuran), poly(3,4-alkylenedioxyfuran), or poly(3,4-alkylenedithiofuran) is used to prepare block copolymers with other conducting or non-conducting polymers, to chemically bind them to a surface, or to permit a specific modification of the end group to modified selective physical properties of the material.

The end-capping monohalo monomer can have the structure:

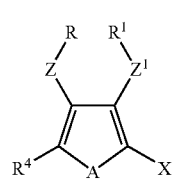

(3)

or the structure:

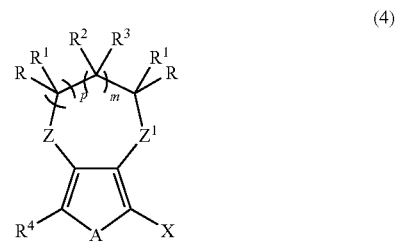

(4)

wherein X is F, Cl, Br or I; Z and $Z^1$ are independently O or S; A is O or NR'; m is 0, 1 Or 2; p is 0 or 1; R, R', $R^1$, $R^1$, $R^3$ and $R^4$ are independently H, alkyl, aryl, alkylaryl, a functional alkyl, aryl, functional aryl alkylaryl, functional alkylaryl group as for structures (1) and (2) for the dihalo monomers. When $R^4$ has a functional group that can be used in a subsequent chain growth or step-growth polymerization, it can be used to form a copolymer that can form a block copolymer where one of the blocks is the substituted polypyrrole, polyfuran, or copolymer.

Networks can be formed after polymerization by cross-linking reactions between appropriate functional groups attached to the 3,4-alkylenedioxy groups, or in the case of 2,5-dihalo-3,4-alkylenedioxypyrroles, groups ultimately bonded to the nitrogen atom of the pyrrole rings. The coupling of two or more dihalo monomers can be carried out between groups on the alkyl, alkylene, aryl or arylene portions of the dihalo monomers, or, in the case where the dihalo monomers are pyrroles, groups bonded to the nitrogen atom of the pyrrole rings. These coupled dihalo monomers can then be used for cross-linking polyhalo monomers during the polymerization of a mixture of these coupled dihalo monomers and dihalo monomers.

The method permits the direct processing of films and other useful forms of the electroactive polymers. The dihalo monomers can be cast onto a surface and subsequently polymerized into an electroactive polymer film. A freestanding film can be cast and polymerized. For example, a layer of the dihalo monomers in a liquid or solution phase can be placed on the surface of a non-solvent subphase liquid (such as water), polymerized (after or without evaporation of a superphase solvent), and transferred from the subphase to a solid substrate (such as glass, mica, indium tin oxide (ITO), metal, and plastic surfaces). Alternately, a film can be cast on a non-stick substrate (such as PTFE, TEFLON™), followed by polymerization and removal from the substrate to produce a freestanding film. The liquid or solution phase polymer can be used to coat a metal, an inorganic non-metal fiber (for example silicon or germanium), or an organic fiber with the dihalo monomers, where it can be polymerized to yield an electroactive polymer coating. Electroactive latexes, microparticles, and nanoparticles can be prepared where an emulsion, microemulsion or nanoemulsion can be produced of the dihalo monomers with a poor or non-solvent, at an appropriate temperature, with or without agitation, and with or without a surfactant. The emulsion can subsequently be polymerized to yield the electroactive latex, microparticles or nanoparticles.

The invention is further illustrated by the non-limiting examples below.

EXAMPLE 1

N-(2-ethylhexyl)-2,5-diiodo-3,4-propylenedioxypyrrole, (5), was prepared by the method described in Zong et al. *J. Org. Chem.* 2001, 66, 6873, and purified by flashing through a pad of basic alumina with dichloromethane as the eluent. Upon standing for one week the pale yellow oil converted into a solid black material without the addition of any solvent, initiator, or catalyst. An opaque purple solution resulted upon dissolving the black material as an approximately 100 mg/mL solution in tetrahydrofuran. Upon addition of hydrazine to the solution, a transparent yellow solution resulted. The polymer was precipitated by the addition of the transparent yellow solution to methanol. Vacuum filtration afforded the solid precipitated polymer. Analysis of the polymer by gel permeation chromatography (calibrated to polystyrene standards) indicated that the polymer had a degree of polymerization of 55 and displayed a narrow molecular weight distribution with a polydispersity index of 1.39. The polymer from (5) was soluble in most organic solvents with the notable exceptions of hexane, methanol, and water. At concentrations of less than 0.5 μg/mL of polymer the solution was very opaque with the addition of dopant such as nitrosonium hexafluorophosphate, yet formed a transparent solution with the addition of a very small amount of hydrazine. This behavior indicates that the polymers of the present invention can be used as electrochromic materials. The electroactivity of the polymer was demonstrated by casting the polymer as a film through the addition of one drop of 5 mg/mL polymer solution in toluene onto a platinum button electrode.

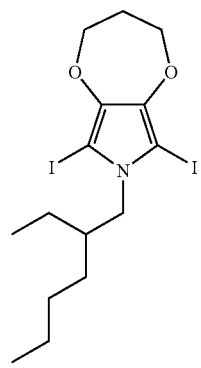

(5)

EXAMPLE 2

The preparation of a poly(3,4-alkylenedioxyfuran) derivative was demonstrated by the polymerization of the diiodo monomer (6) illustrated below. The polymerization occurred and the isolation of the polymer was carried out in the manner described in Example 1. The isolated polymer was characterized by gel permeation chromatography (calibrated to polystyrene standards) and was found to have a molecular weight of 4,700, corresponding to a degree of polymerization of 15 and a polydispersity index of 1.81.

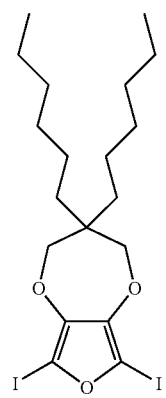

(6)

EXAMPLE 3

Four diiodinated monomers, (5), (7), (8), and (9) were polymerized under various conditions. The four polymers contained different pendant groups, and exhibited different degrees of polymerization and different materials properties. The racemic branched chain N-ethylhexyl group of polymer (5) was soluble in a large variety of organic solvents, but insoluble in hexane and water. Hexane was used as the non-solvent for precipitation of the polymer from (5) to effectively removed low molecular weight portions of the polymer. Monomer (7) was a solid at room temperature, and was successfully polymerized in the solid state, but with a reaction time that was an order of magnitude greater than that of the polymerization of (5). Precipitation of the polymer from (7) was carried out using methanol. Monomer (8) is a liquid at room temperature and was polymerized to a presumably atacetic polymer that was precipitated into hexane. The straight-chain triethylene glycol monomethyl ether chains of monomer (9) was polymerized in 4 days at room temperature which gave a tacky dark mass with a high Mn and a narrow polydispersity after precipitation into hexane.

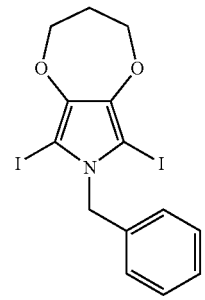

(7)

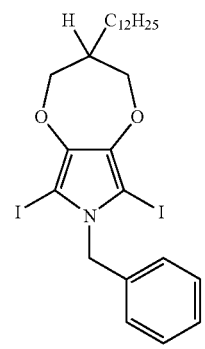

(8)

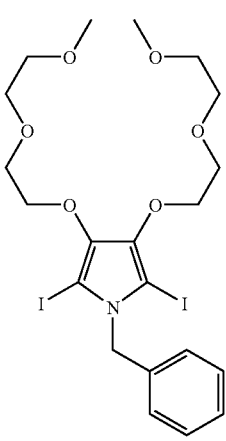

(9)

Table 1 summarizes the molecular weight data for polymer from (5), (7), (8), and (9). With the exception of the polymer from (7) all polymers were of relatively high molecular weight, with Mn values in the range of about 9000-14000 Da, which corresponds to 20-50 repeat units. The polymer from (7) was of lower molecular weight with a Mn of 3800 Da corresponds to a polymer structure of 16 repeat units, which is sufficient large for use as an electrochemical material.

TABLE 1

Molecular Weight for Polymers via Deiodination Polymerization

| Monomer | Mn (Da) | Mw/Mn | Xn[a] |
|---------|---------|-------|-------|
| 5 | 14,200 | 1.75 | 56.0 |
| 7 | 3,800 | 1.59 | 15.6 |
| 8 | 8,700 | 1.81 | 21.4 |
| 9 | 10,300 | 1.68 | 25.7 |

[a]Number average degree of polymerization

It is to be understood that while the invention has been described in conjunction with the preferred specific embodiments thereof, that the foregoing description as well as the examples, which followed are intended to illustrate and not limit the scope of the invention. Other aspects, advantages and modifications within the scope of the invention will be apparent to those skilled in the art to which the invention pertains.

We claim:

1. A method of preparing a substituted polypyrrole, polyfuran, or copolymer thereof comprising the steps of:
providing a multiplicity of at least one 2,5-dihalo-3,4-disubstituted-pyrrole monomer, at least one 2,5-dihalo-3,4-disubstituted-furan monomers, or a mixture thereof of the formula:

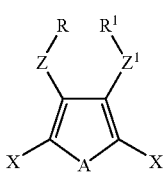

or the formula:

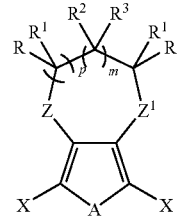

where X is independently F, Cl, Br, or I; Z and $Z^1$ are independently O or S; A is O or NR'; m is 0, 1, or 2; p is 0 or 1; and R, R', $R^1$, $R^2$, and $R^3$ are independently H, alkyl, aryl, alkylaryl, a functional alkyl, aryl, functional aryl alkylaryl, functional alkylaryl group and where any or all of the multiple substituents R, $R^1$, $R^2$, or $R^3$ are chosen independently; and polymerizing said multiplicity of monomers.

2. The method of claim 1, wherein said dihalo monomer is provided as a solid, a liquid, or a solute in solution.

3. The method of claim 1, further comprising the step of providing at least one end-capping monohalo monomer of the formula:

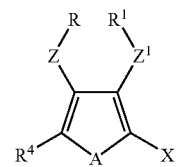

or the formula:

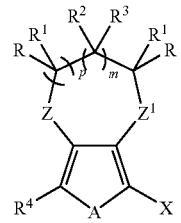

where X is independently F, Cl, Br, or I; Z and $Z^1$ are independently O or S; A is O or NR'; m is 0, 1, or 2; p is 0 or 1; and R, R', $R^1$, $R^2$, $R^3$ and $R^4$ are independently H, alkyl, aryl, alkylaryl, a functional alkyl, aryl, functional aryl alkylaryl, functional alkylaryl group and where any or all of the multiple substituents R, $R^1$, $R^2$, or $R^3$ are chosen independently.

4. The method of claim 1, further comprising the step of providing a cross-linking polyhalo monomer wherein said polyhalo monomer comprises two or more of said dihalo monomers connected via a bond or bonds between any R, R', $R^1$, $R^2$, or $R^3$ groups of two or more dihalo monomers.

5. The method of claim 1, further comprising a step of adding hydrazine.

6. The method of claim 1, wherein said dihalo monomer is provided as a liquid, or a solute in solution and said polymerizing step occurs upon a solid substrate to form said polymer as a coating.

7. The method of claim 6, wherein said solid substrate is non-stick wherein said polymer is a free-standing film after removal from said non-stick substrate.

8. The method of claim 6, wherein said substrate is a fiber.

9. The method of claim 1, wherein said dihalo monomer is provided as a liquid or a solute in solution and said polymerizing step occurs upon a non-solvent for said liquid or solution of monomers to form said polymer as a free-standing film after removal from said non-solvent.

10. The method of claim 8, wherein the dihalo monomer is provided as solute in solution and the solvent is partially to totally removed prior to said polymerization step.

11. The method of claim 1, further comprising the step of providing an acid wherein the acid comprises a Lewis acid, protic acid, organic acid or polymeric acid.

* * * * *